United States Patent

Ishikawa et al.

[11] Patent Number: 6,154,506
[45] Date of Patent: Nov. 28, 2000

[54] TIMING RECOVERY AND TRACKING METHOD AND APPARATUS FOR DATA SIGNALS

[75] Inventors: Hiroyasu Ishikawa; Hideyuki Shinonaga, both of Saitama; Hideo Kobayashi, Tokyo, all of Japan

[73] Assignee: Kokusai Denshin Denwa Co., Ltd., Tokyo, Japan

[21] Appl. No.: 09/070,931

[22] Filed: May 1, 1998

[30] Foreign Application Priority Data

May 2, 1997 [JP] Japan ................................ 9-127815

[51] Int. Cl.[7] ........................ H04L 27/14; H04L 27/16; H04L 27/22
[52] U.S. Cl. ........................................ 375/326; 375/355
[58] Field of Search ............................. 375/326, 377, 375/355, 342, 340, 285, 346, 348

[56] References Cited

U.S. PATENT DOCUMENTS 5,134,637 7/1992 Beyer et al. .
5,764,651 6/1998 Bullock et al. .

*Primary Examiner*—Chi H. Pham
*Assistant Examiner*—Jean B. Corrielus
*Attorney, Agent, or Firm*—Arent Fox Kintner Plotkin & Kahn, PLLC

[57] ABSTRACT

A timing recovery and tracking method and apparatus with respect to data signal in a digital communication system is provided. The method includes a step of setting a time window for making a decision based upon a predetermined threshold level, the time window having a time period corresponding to a transmission data rate in the digital communication system, a step of detecting a time duration positioned within the time window, a level of a received signal being higher than the predetermined threshold level during the time duration, a step of assuming a substantially middle point of the time duration as an optimum decision point of the received signal, and a step of updating the time window so that the updated time window has its center at a position of the assumed optimum decision point.

8 Claims, 8 Drawing Sheets

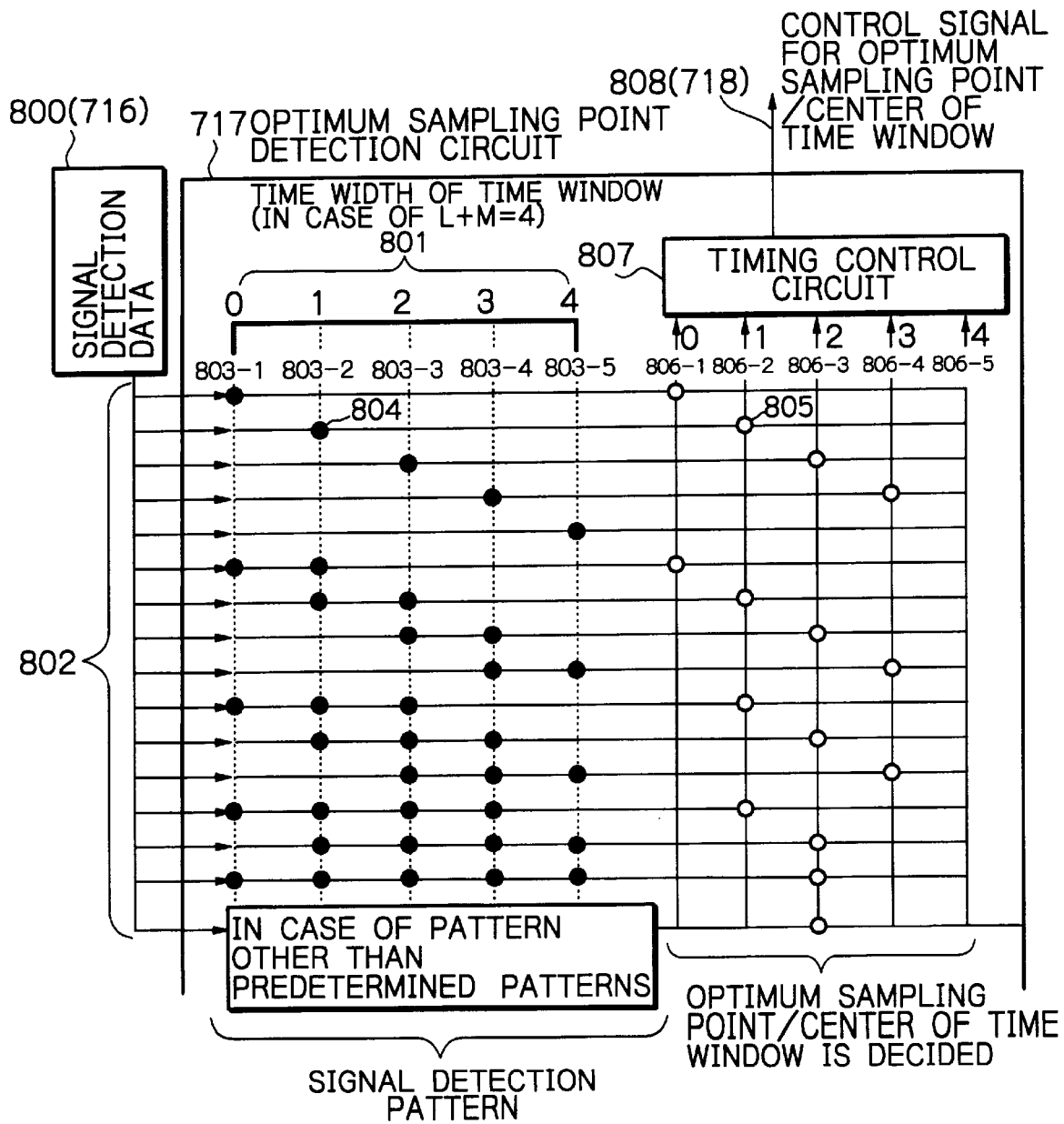

TIMING RECOVERY AND TRACKING METHOD AND APPARATUS FOR DATA SIGNALS

FIELD OF THE INVENTION

The present invention relates to a method and apparatus for timing recovery and tracking of data signals. The timing recovery and tracking method and apparatus can be used in any wireless communication system such as a satellite communication system for fixed stations, a satellite communication system for mobile stations, a terrestrial wireless communication system for fixed stations, a terrestrial wireless communication system for mobile stations, a wireless LAN system and a private wireless communication system, or in any wire communication system for transmitting information via cables such as optical fiber cables and coaxial cables.

DESCRIPTION OF THE RELATED ART

In the receiving side of a digital communication system for transmitting data at a constant transmission data rate, the modulated signal transmitted from the sending side is converted into a baseband signal of triangular shape pulse or sine wave shape pulse by means of a demodulator, and then data decision with respect to the received signal will be executed at timings which are determined in accordance with the transmission data rate. However, when the data decision timing is deviated from a peak voltage point of a desired signal, the decision error rate performance of the received signal greatly deteriorates. Therefore, it is necessary that the receiving side detects or recovers an optimum timing for obtaining the best decision error rate performance of the received signal so as to establish timing synchronization between the sending side and the receiving side, just after the start of the data transmission. Also, in order to continue the data transmission, it is necessary to have a tracking function which maintains the timing synchronization between the sending side and the receiving side.

As for the timing recovery method of received data signals adopted for the digital communication systems, known is a simple method for assuming that the desired signal was just received at the moment when the voltage level of the received signal exceeds a predetermined threshold level to define that moment as a decision timing. However, according to this known method, an incorrect decision as that a desired signal pulse has been received may be executed and then the wrong data will be inserted into correct data sequences even when the received signal level exceeds due to noise or interference signals from the neighbor channel. Thus, in this case, all the data after the incorrect decision will burst into error.

A time window method is known for solving the above-mentioned problems. This method introduces a time window with a time period corresponding to the transmission data rate so as to detect, within the period of the time window, a received signal pulse with a level above the threshold level. By using the time window, an incorrect detection rate with respect to signal pulses generated due to noise or interference signals from the neighbor channel can be greatly decreased.

The time window method is effective when the symbol timing of the desired signal pulse is recovered. In general, an initial acquisition of the timing can be easily completed by detecting, by cut and try method, the timing at a preamble data portion for timing recovery, which is attached to the head of the sending data signals. Therefore, hereinafter, the tracking function of the timing will be described in detail.

As shown in FIG. 1, according to the conventional timing tracking method using a time window, an optimum decision point of the timing is decided to a time when the level of the received signal pulse exceeds or lowered a predetermined threshold level within a period of the time window, and a middle point of the next time window is changed to this timing. However, according to this method, the middle point of the time window somewhat deviates from the peak point of the received pulse, namely the optimum decision point of the timing. Thus, when the received pulse itself moves along the time axis due to channel distortion, in other words when a jitter occurs, summation of the deviations of time between the middle point of the time window and the peak point of the received pulse increases with the lapse of time. Therefore, depending upon the state of the channel distortion, the received pulse may be frequently out of the time window. Thus, the timing tracking function cannot be kept causing burst decision errors of the received data to occur.

Referring to FIG. 1, the problems of the conventional time window method will be described in detail. At time $t=t_k$, a new time window 101-2 with a middle point which is the moment 103-1 when the level of the received signal pulse 100-1 exceeds a predetermined threshold level 102 within a period of the time window 101-1 established at previous time $t=t_{k-1}$ is set. This new time window 101-2 has a time period equal to sum of widths $(T_M+T_L)$ of the forward time window 105-2 and the backward time window 104-2. Similar to this, a new time window 101-3 is set at time $t=t_{k+1}$. However, since the desired pulse itself greatly deviates along the time axis due to jitters 107-2 and 107-3 which are caused by channel distortion, the point 103-3 at which the received signal pulse 100-3 exceeds the threshold 102 gets out of the time window 101-3 at time $t=t_{k+2}$. In this case, a new time window 101-4 cannot be set at this time $t=t_{k+2}$ and therefore the timing tracking function cannot be kept causing burst decision errors of the received data to occur.

SUMMARY OF THE INVENTION

It is therefore an object of the present invention to provide a timing recovery and tracking method and apparatus, whereby timing tracking accuracy at the receiving side can be improved.

Another object of the present invention is to provide a timing recovery and tracking method and apparatus, whereby influence of jitters due to channel distortion can be restricted.

According to the present invention, a timing recovery and tracking method and apparatus with respect to data signal in a digital communication system are provided. The method includes a step of setting a time window for making a decision based upon a predetermined threshold level, the time window having a time period corresponding to a transmission data rate in the a digital communication system, a step of detecting a time duration Δt positioned within the time window, a level of a received signal being higher than the predetermined threshold level during the time duration, a step of assuming a substantially middle point Δt/2 of the time duration as an optimum decision point of the received signal, and a step of updating the time window so that the updated time window has its center at a position of the assumed optimum decision point. The apparatus includes a unit for setting a time window for making a decision based upon a predetermined threshold level, the time window having a time period corresponding to a transmission data rate in the digital communication system, a unit for detecting a time duration Δt positioned within the time window, a level of a received signal being higher than the predetermined threshold level during the time duration, a unit for assuming a substantially middle point Δt/2 of the time duration as an optimum decision point of the received signal, and a unit for updating the time window so that the updated time window has its center at a position of the assumed optimum decision point.

In the timing recovery and tracking method and apparatus adopted for continuous signals, as shown in FIG. 2, first, a time window 201 constituted by a forward window 205 with a duration $T_M$ and a backward window 204 with a duration $T_L$ which are located at both sides of the middle point 203 is set. The time window 201 has a time period corresponding to a transmission data rate or symbol timing in the digital communication system. Then, a time duration Δt 206, within the time window 201, during which the level of the received pulse signal 200 is continuously higher than a threshold level 202 is detected. Then, a middle point 207 of the time duration Δt 206 is assumed as the optimum decision point of the received pulse signal 200 and a new time window 208 having this middle point 207 as its center is reset. Thus, the symbol timing of the data signals can be tracked even in a communication system in which a peak point of a received signal fluctuates along the time axis due to channel distortion.

According to the present invention, also, a timing recovery and tracking method and apparatus are provided. The method includes a step of setting a time window for making a decision based upon a predetermined threshold level, the time window having a time period corresponding to a transmission data rate in the digital communication system, a step of sampling received signal with a sampling rate which is an integral multiple of the transmission data rate to provide sampled signals, a step of detecting a sampling duration $t_{i,1}-t_{i,n}$ positioned within the time window, levels of the sampled signals being higher than the predetermined threshold level during the sampling duration, a step of assuming a substantially middle point of the sampling duration as an optimum decision point of the received signal, and a step of updating the time window so that the updated time window has its center at a position of the assumed optimum decision point.

It is preferred that the assuming step includes a step of assuming m-th sampling point or (m+1)-th sampling point in the sampling duration $t_{i,1}-t_{i,n}$ as an optimum decision point of the received signal when the number n of samples in the sampling duration $t_{i,1}-t_{i,n}$ is an even number (n=2m, m is a natural number), and/or a step of assuming (m+1)-th sampling point in the sampling duration $t_{i,1}-t_{i,n}$ as an optimum decision point of the received signal when the number n of samples in the sampling duration $t_{i,1}-t_{i,n}$ is an odd number (n=2m+1).

The apparatus include a unit for setting a time window for making a decision based upon a predetermined threshold level, the time window having a time period corresponding to a transmission data rate in the digital communication system, a unit for sampling received signal with a sampling rate which is an integral multiple of the transmission data rate to provide sampled signals, a unit for detecting a sampling duration $t_{i,1}-t_{i,n}$ positioned within the time window, levels of the sampled signals being higher than the predetermined threshold level during the sampling duration, a unit for assuming a substantially middle point of the sampling duration as an optimum decision point of the received signal, and a unit for updating the time window so that the updated time window has its center at a position of the assumed optimum decision point.

It is preferred that the assuming unit includes a unit for assuming m-th sampling point or (m+1)-th sampling point in the sampling duration $t_{i,1}-t_{i,n}$ as an optimum decision point of the received signal when the number n of samples in the sampling duration $t_{i,1}-t_{i,n}$ is an even number (n=2m, m is a natural number), and/or a unit for assuming (m+1)-th sampling point in the sampling duration $t_{i,1}-t_{i,n}$ as an optimum decision point of the received signal when the number n of samples in the sampling duration $t_{i,1}-t_{i,n}$ is an odd number (n=2m+1).

In the timing recovery and tracking method and apparatus adopted to data transmission systems located on the discrete sampling values, as shown in FIG. 3, first, received pulse signal 300 is sampled at a sampling timing corresponding to an integral multiple of the transmission data rate and a sampling duration $t_{i,1}-t_{i,n}$ 306, within the time window 301, during which the level of the received pulse signal 300 is sequentially higher than a threshold level 302 is detected. Then, if the number n of samples in the sampling duration $t_{i,1}-t_{i,n}$ 306 is an even number (namely n=2m, m is a natural number), the m-th sampling point (t=$t_m$) or the (m+1)-th sampling point (t=$t_{m+1}$) in the sampling duration $t_{i,1}-t_{i,n}$ 306 is assumed as the optimum decision point 309 of the received pulse signal 300. If the number n of samples in the sampling duration $t_{i,1}-t_{i,n}$ 306 is an odd number (namely n=2m+1), the (m+1)-th sampling point (t=$t_{m+1}$) in the sampling duration $t_{i,1}-t_{i,n}$ 306 is assumed as the optimum decision point 309 of the received pulse signal 300. Thus, a new time window 308 having this sampling point as its center and having a forward window 305 constituted by M portions and a backward window 304 constituted by L portions relocated in both sides of the center is reset. In this case, the middle point 307 of the time window 308 is positioned on the L-th sampling point. Thus, the symbol timing of the data signals can be tracked even in a communication system in which a peak point of a received signal fluctuates along the time axis due to channel distortion.

According to the present invention, as shown in FIG. 4, at time t=$t_k$, a new time window 401-2 with a middle point 403-2 which is a center of a time duration 406-1 during which the level of the received pulse signal 400-1 is continuously higher than a threshold level 402 within a period of the time window 401-1 established at time t=$t_{k-1}$ is set. This new time window 401-2 has time period equal to sum of widths ($T_M+T_L$) of the forward time window 405-2 and the backward time window 404-2. Similar to this, a new time window 401-3 is set at time t=$t_{k+1}$ even if the desired pulse 400-2 greatly deviates along the time axis due to jitter 407-2 which is caused by channel distortion. Also, a new time window 401-4 is set at time t=$t_{k+2}$ even if the desired pulse 400-3 greatly deviates along the time axis due to jitter 407-3 which is caused by channel distortion. This is because the middle points 403-3 and 403-4 of the respective time windows 401-3 and 401-4 are centers of time durations 406-2 and 406-3 during which the level of the received pulse signals 400-2 and 400-3 are continuously higher than the threshold level 402 within the time windows 401-2 and 401-3, respectively.

As a result, according to the present invention, the symbol timing of the data signals can be tracked with high stability and in precise even in a communication system in which a peak point of a received signal fluctuates along the time axis due to channel distortion, in other words jitters 407-2 and 407-3 occur. Thus, the number of out of synchronization in the receiving side of the digital communication system can be reduced and also deviation of the data decision point with the peak point of the received signal can be minimized resulting the decision error rate performance at the receiving side to extremely improve.

In summary, advantages of the present invention are as follows:
(1) Influence from time jitters in the desired signals due to channel distortion can be effectively suppressed, and the symbol timing of the received data signals can be tracked with high stability and in precise;
(2) Since recovery of the symbol timing can be precisely executed, the deviation of the data decision point with the peak point of the received signals can be minimized resulting the decision error rate performance at the receiving side to extremely improve;
(3) Since the number of burst errors due to out of timing tracking can be reduced, error control techniques such as error correction codes can be easily applied; and
(4) Thanks for improved timing tracking ability, data transmission can be executed under low C/N conditions.

Further objects and advantages of the present invention will be apparent from the following description of the preferred embodiments of the invention as illustrated in the accompanying drawings.

BRIEF DESCRIPTION OF THE DRAWINGS

FIG. 8 shows an example of an optimum sampling point detection circuit in the embodiment shown in FIG. 7.

DESCRIPTION OF THE PREFERRED EMBODIMENTS

Figure 1:
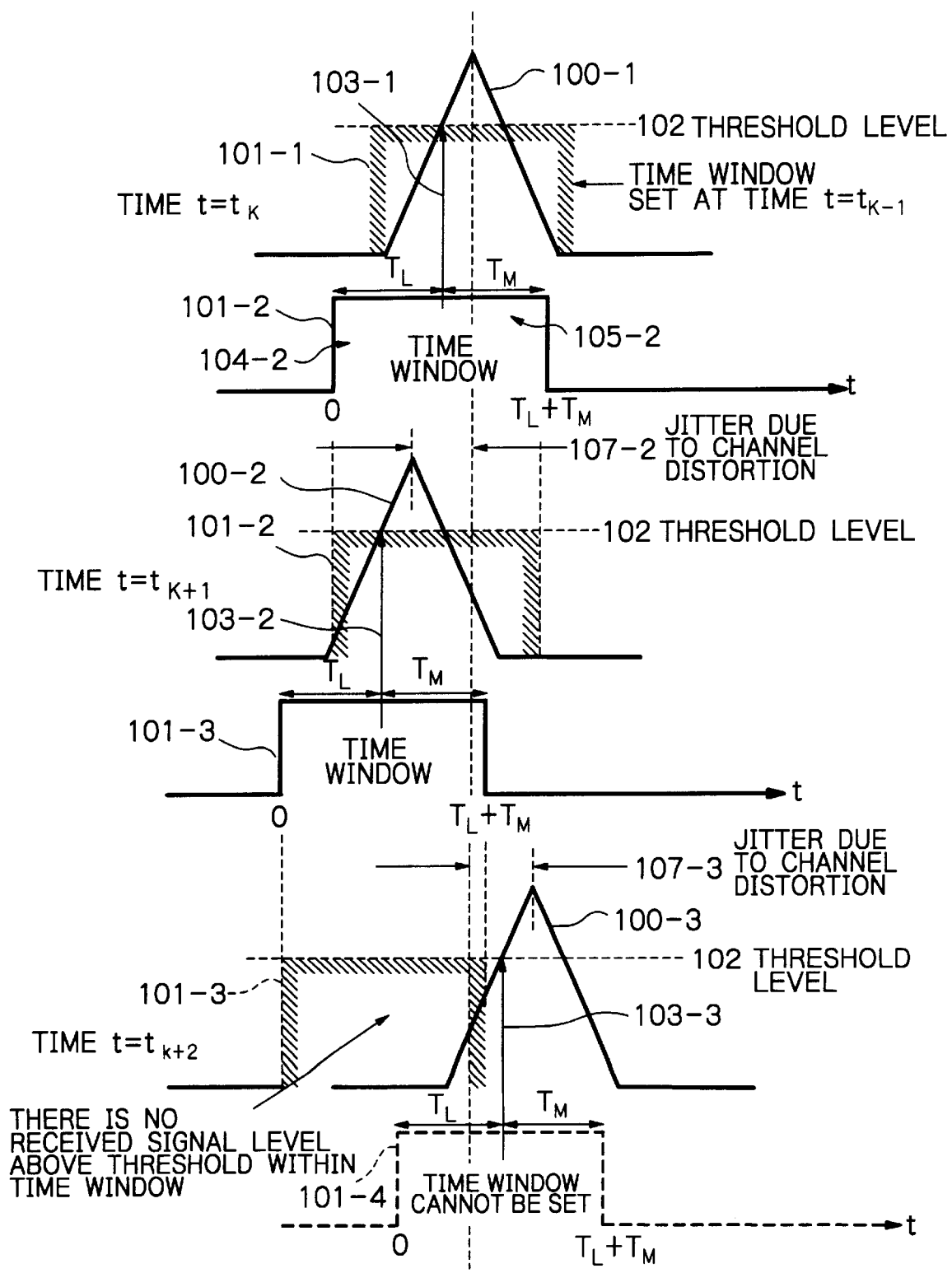
FIG. 1 illustrates already described operations of the conventional timing tracking method using a time window.
Figure 2:
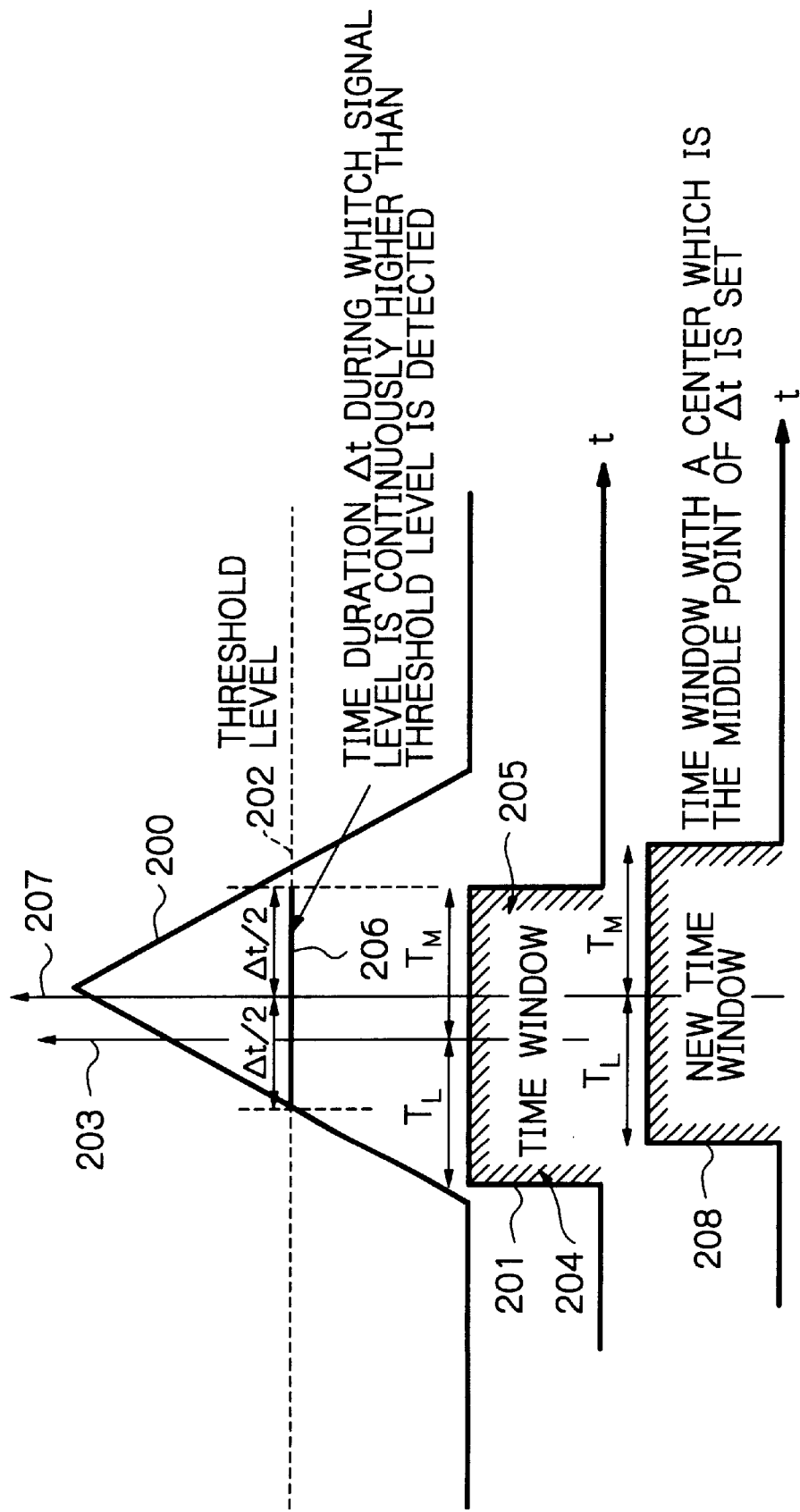
FIG. 2 illustrates already described basic concept of setting a time window for a continuous signal in a timing recovery and tracking apparatus method and according to the present invention.
Figure 3:
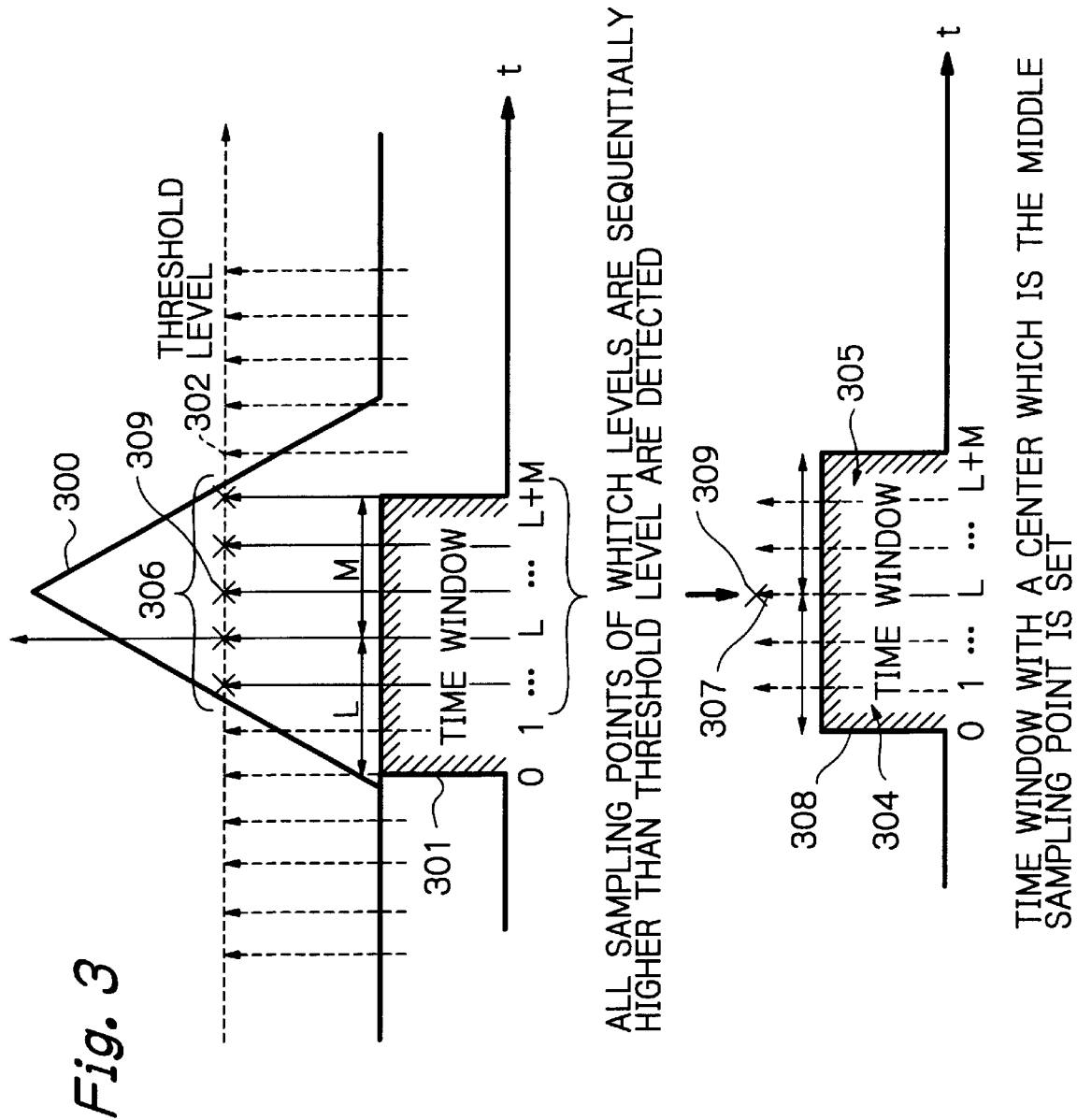
FIG. 3 illustrates already described basic concept of setting a time window for discrete sampling signals in the timing recovery and tracking method and apparatus according to the present invention.
Figure 4:
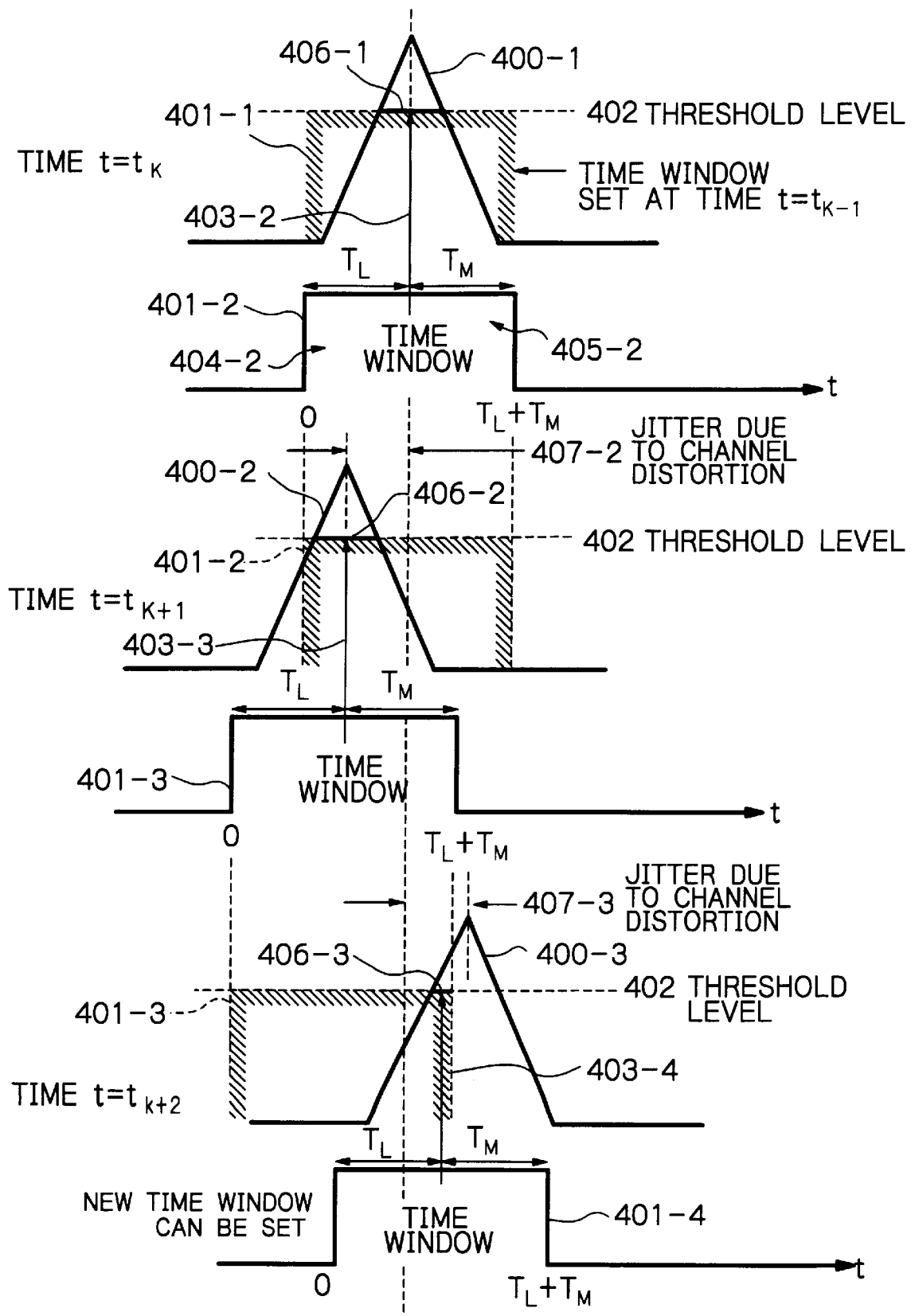
FIG. 4 illustrates already described operations of a timing tracking method according to the present invention.
Figure 5:
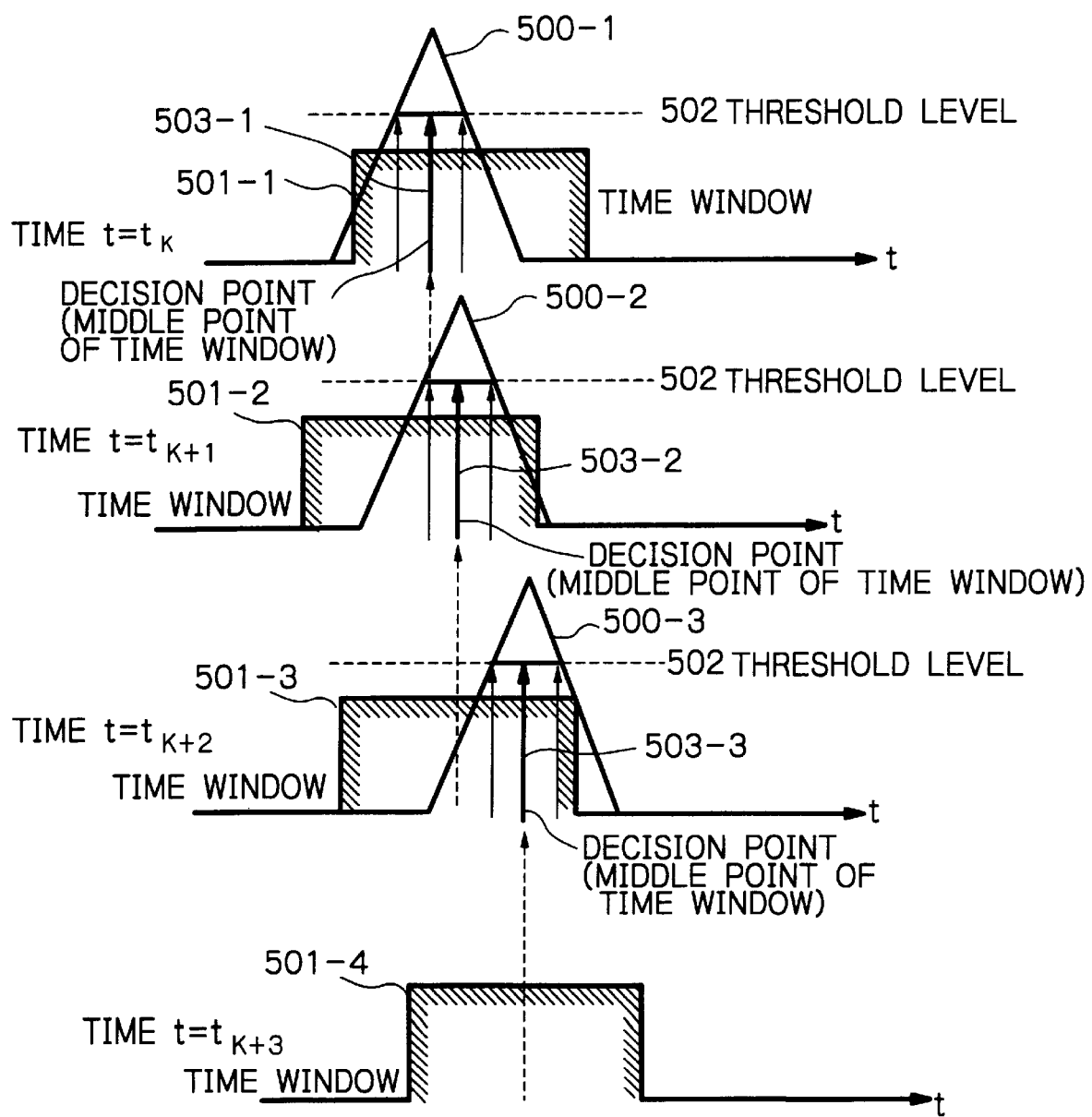
FIG. 5 illustrates an example of setting a time window in the timing recovery and tracking method and apparatus according to the present invention.

FIG. 5 illustrates a process example of setting a time window in the timing recovery and tracking method and apparatus used in data transmission systems based upon the discrete sampling values according to the present invention.

At time $t=t_k$, a new time window 501-2 with a middle point 503-2 which is a center sampling point among a plurality of sampling points with sampling levels higher than a threshold level 502 within a period of the time window 501-1 established at time $t=t_{k-1}$ is set. Similar to this, new time windows 501-3 and 501-4 are set at time $t=t_{k+1}$ and time $t=t_{k+2}$, respectively. Since the middle points 503-2 and 503-3 of the respective time windows 501-3 and 501-4 are centers of the sampling points with levels higher than the threshold level 502 within the time windows 501-2 and 501-3, respectively, the time windows 501-3 and 501-4 cover the desired pulse signal and the timing tracking state can be kept with high stability even if the desired pulse greatly deviates along the time axis due to Jitter caused by channel distortion.

Figure 6A:
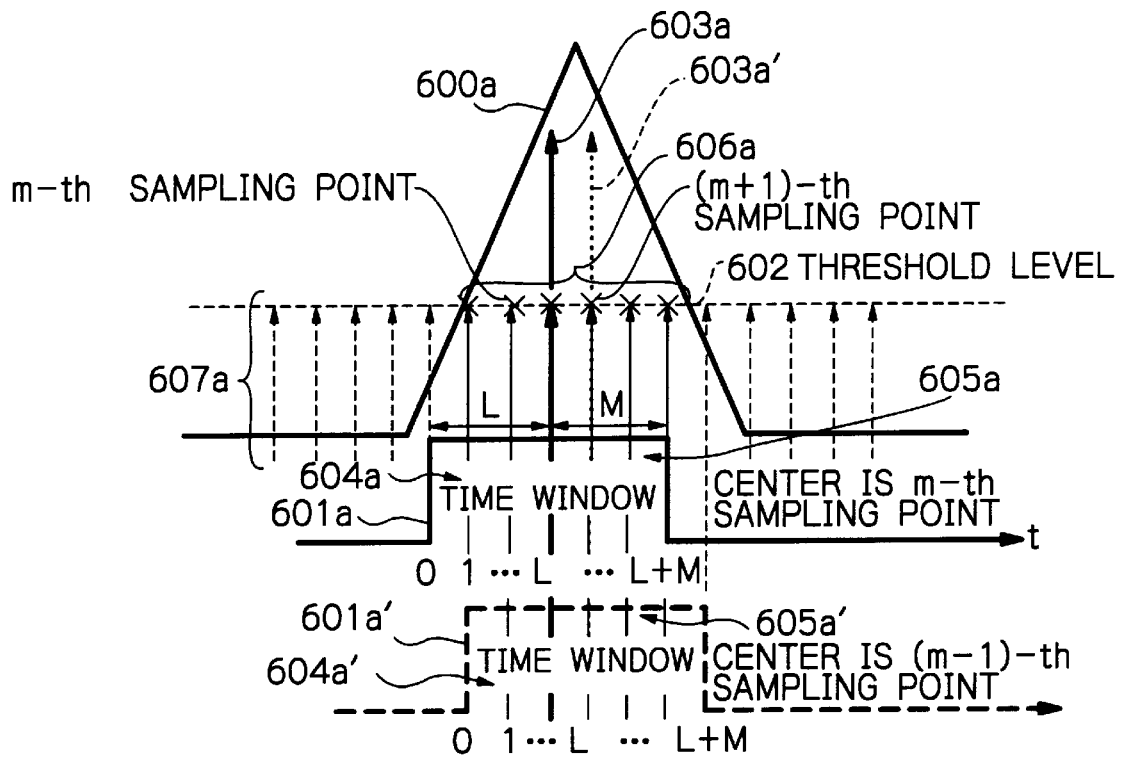
FIGS. 6a and 6b illustrate examples of determination of a center of the time window and optimum decision point in the timing recovery and tracking method and apparatus according to the present invention.
Figure 6B:
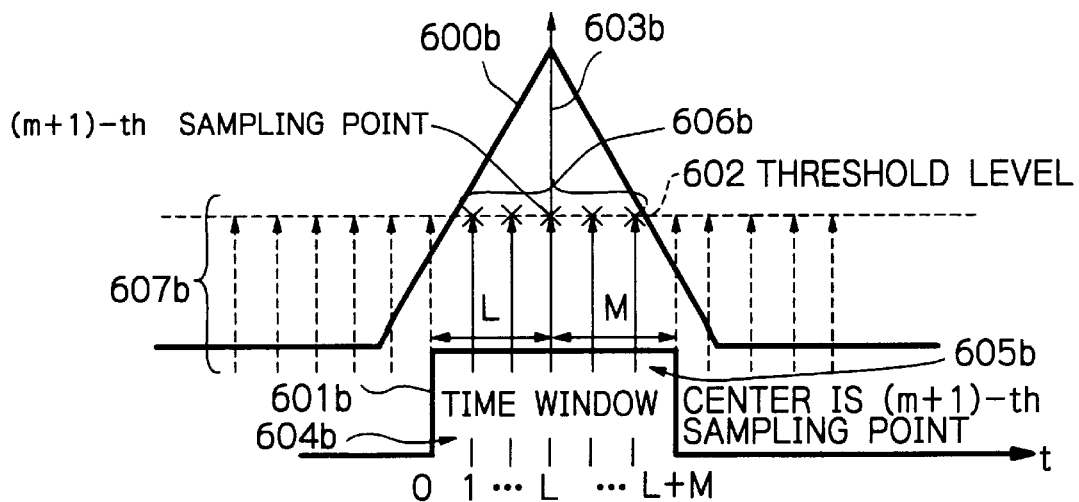

FIGS. 6a and 6b illustrate setting of a center of the time window and optimum decision point in the timing recovery and tracking method and apparatus used in the data transmission systems based upon the discrete sampling values. FIG. 6a relates to a case in which the number of sampling points with sampling levels higher than a threshold level is an even number (namely 2m, m is a natural number), and FIG. 6b relates to a case in which the number of sampling points with sampling levels higher than the threshold level is an odd number (namely 2m+1).

In FIG. 6a, reference numeral 600a denotes a received pulse signal, 601a and 601a' new time windows, 602 a threshold level, 603a and 603a' decision points, 604a and 604a' backward windows, 605a and 605' forward windows and 607a a group of sampling points of the pulse signal 600a. The number of sampling points 606a located within the previous time window among the sampling points with levels higher than the threshold level 602 is 2m (even number). In this case, a center of the new time window is set to the m-th sampling point or (m+1)-th sampling point among the sampling points 606a located within the previous time window and provided with levels higher than the threshold level 602. Thus, the new time window 601a or 601a' with the middle point 603a or 603a' and with the forward window 605a or 605a' constituted by M portions and the backward window 604a or 604a' constituted by L portions is provided.

In FIG. 6b, reference numeral 600b denotes a received pulse signal, 601b a new time window, 602 a threshold level, 603b a decision point, 604b a backward window, 605b a forward window and 607b a group of sampling points of the pulse signal 600b. The number of sampling points 606b located within the previous time window among the sampling points with levels higher than the threshold level 602 is 2m+1 (odd number). In this case, a center of the new time window is set to (m+1)-th sampling point among the sampling points 606b located within the previous time window and provided with levels higher than the threshold level 602. Thus, the new time window 601b with the middle point 603b and with the forward window 605b constituted by M portions and the backward window 604b constituted by L portions is provided.

Figure 7:
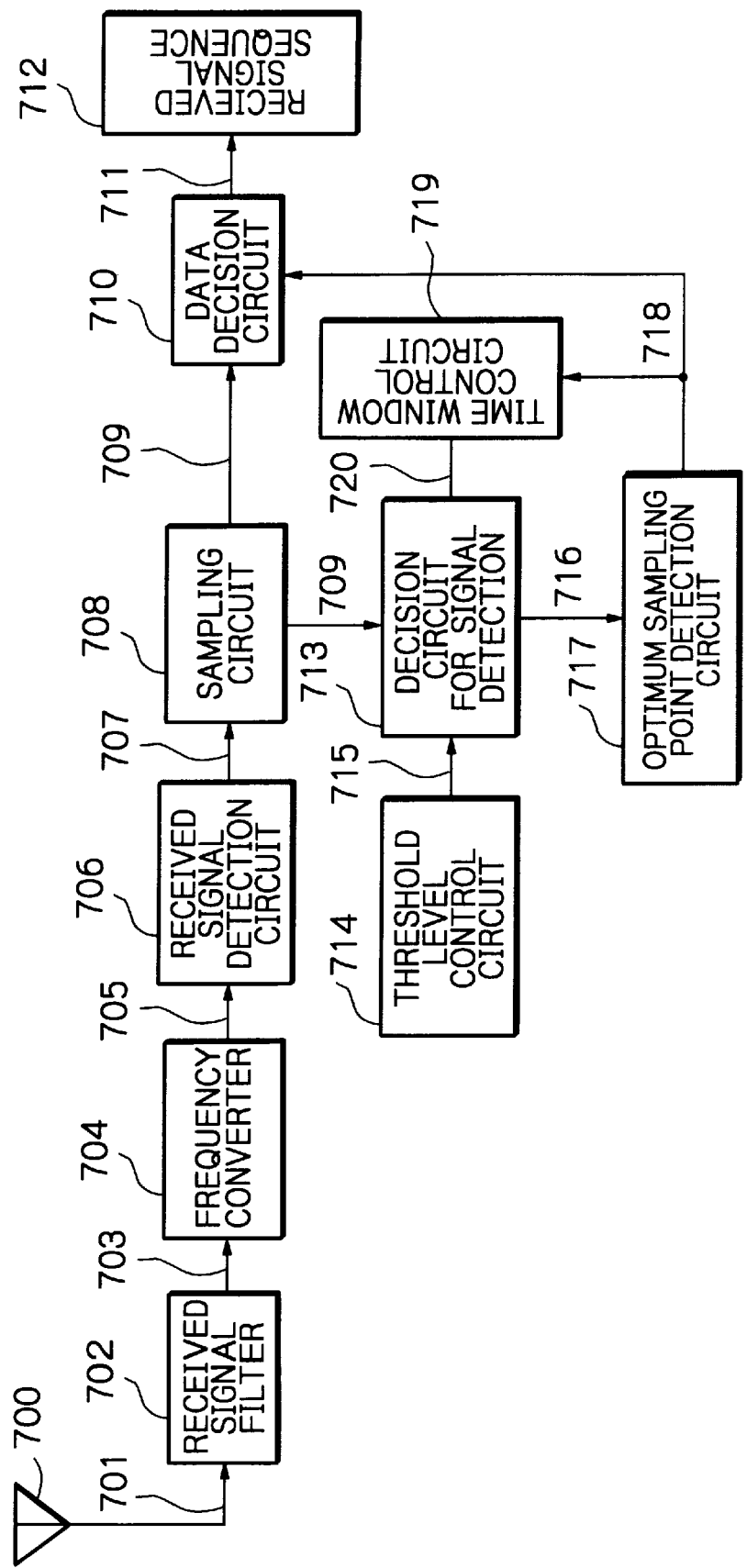
FIG. 7 shows a block diagram of a preferred embodiment of a receiving circuit in the timing recovery and tracking apparatus according to the present invention.

FIG. 7 illustrates a preferred embodiment of a receiving circuit in the timing recovery and tracking apparatus according to the present invention.

As shown in the figure, a radio frequency signal 701 received by an antenna 700 is applied to a bandpass filter 702. In the filter 702, noise components out of a desired signal bandwidth in the received signal are omitted to output a desired signal 703. This desired signal 703 is converted into an intermediate frequency signal 705 at a frequency converter 704, and then the intermediate frequency signal is converted into a baseband signal 707 at a received signal detection circuit 706. The received baseband signal 707 is sampled to provide discrete sampling point signals 713 at a sampling circuit 708. The sampling point signals 709 are applied to a data decision circuit 710 and also to a decision circuit for signal detection 713.

In the decision circuit 713, all the sampling point signals located within a time window 720 set by a time window control circuit 719 and provided with levels higher than a threshold level 715 applied from a threshold level control circuit 714 are detected and output as sampling point group signals 716. Then, in an optimum sampling point detection circuit 717, a middle sampling point in the sampling point group signals 716 is detected. The detected middle point information 718 is applied to the time window control circuit 719 to use as information indicating a center of a new time window, and also applied to the data decision circuit 710 to use as optimum sampling information for the sampling point signals 709. Namely, in the data decision circuit 710, decision data 711 in the sampling point signals 709, located at the optimum sampling points which are defined by the information 718 are detected and output as received signal sequence 712.

FIG. 8 illustrates an example of the optimum sampling point detection circuit 717 shown in FIG. 7. In this example, it is assumed that a duration 801 of the time window is equal to L+M=4.

As shown in FIG. 8, the signal detection data 800 (sampling point group signals 716) from the decision circuit 713 are simultaneously applied to input lines 802 as 0/1 signal (High/Low signal) sequence corresponding to the respective sampling number "0", "1", "2", "3" and "4" in the time window. To a sampling point with a level higher than the threshold level has data of 1 (High), and to a sampling point with a level equal to or lower than the threshold level has data of 0 (Low). At the points of intersections of the input lines 802 and lines 803-1 to 803-5 corresponding to the respective sampling points in the time window, AND operations of the input sampling point data with weighting values are executed, respectively. As for the weighting values for AND operation, 1 (High) is assigned at the points of intersection indicated by filled-in circles (point 804 for example) and 0 (Low) is assigned at another points of intersection. Thus, outputs from lines on which the input signal detection data 800 and the weighting values for AND operation are completely coincide with each other will have the maximum value of 5.

In the optimum sampling point detection circuit 717, furthermore, optimum sampling points indicated by blank circles (point 805 for example) are preliminarily provided. These optimum sampling points are connected to lines 806-1 to 806-5 for outputting sampling points located within the time window. Therefore, if a line with the maximum result of the AND operation is uniquely decided, an optimum sampling point and a center point of the time window can be directly decided. These information are output from a timing control circuit 807 as a control signal for optimum sampling point and center point of the time window 808 (718) to the data decision circuit 710 and the time window control circuit 719 shown in FIG. 7. When data with a pattern other than predetermined patterns is input, the AND operation result is not the maximum value and thus the previous center point of the time window and the previous optimum sampling points are maintained without update.

As will be understood from the above-description, according to this embodiment, influence from time Jitter in the desired signal due to channel distortion can be effectively suppressed as shown in FIG. 5 to provide high quality communication lines with high stability.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of timing recovery and tracking with respect to data signal in a digital communication system, said method comprising the steps of:

setting a time window for making a decision based upon a predetermined threshold level, said time window having a time period corresponding to a transmission data rate in the digital communication system;

detecting a time duration positioned within said time window, a level of a received signal being higher than the predetermined threshold level during said time duration;

assuming a substantially middle point of said time duration as an optimum decision point of the received signal; and updating the time window so that the updated time window has its center at a position of said assumed optimum decision point, thereby recovering timing synchronization with the received signal.

2. A method of timing recovery and tracking with respect to data signal in a digital communication system, said method comprising the steps of:

setting a time window for making a decision based upon a predetermined threshold level, said time window having a time period corresponding to a transmission data rate in the digital communication system;

sampling received signal with a sampling rate which is an integral multiple of the transmission data rate to provide sampled signals;

detecting a sampling duration $t_{i,1}$–$t_{i,n}$ positioned within said time window, levels of the sampled signals being higher than the predetermined threshold level during said sampling duration;

assuming a substantially middle point of said sampling duration as an optimum decision point of the received signal; and updating the time window so that the updated time window has its center at a position of said assumed optimum decision point, thereby recovering timing synchronization with the received signal wherein I is a sample and n the number of samples.

3. The method as claimed in claim 2, wherein said assuming step includes a step of assuming m-th sampling point or (m+1)-th sampling point in said sampling duration $t_{i,1}$–$t_{i,n}$ as said optimum decision point of the received signal when the number n of samples in the sampling duration $t_{i,1}$–$t_{i,n}$ is an even number (n=2m, m is a natural number).

4. The method as claimed in claim 3, wherein said assuming step includes a step of assuming (m+1)-th sampling point in said sampling duration $t_{i,1}$–$t_{i,n}$ as an optimum decision point of the received signal when the number n of samples in the sampling duration $t_{i,1}$–$t_{i,n}$ is an odd number (n=2m+1).

5. An apparatus for timing recovery and tracking with respect to data signal in a digital communication system, said apparatus comprising:

means for setting a time window for making a decision based upon a predetermined threshold level, said time window having a time period corresponding to a transmission data rate in the digital communication system;

means for detecting a time duration positioned within said time window, a level of a received signal being higher than the predetermined threshold level during said time duration;

means for assuming a substantially middle point of said sampling duration as an optimum decision point of the received signal; and means for updating the time window so that the updated time window has its center at a position of said assumed optimum decision point, thereby recovering timing synchronization with the received signal.

6. An apparatus for timing recovery and tracking with respect to data signal in a digital communication system, said apparatus comprising:

means for setting a time window for making a decision based upon a predetermined threshold level, said time window having a time period corresponding to a transmission data rate in the digital communication system;

means for sampling received signal with a sampling rate which is an integral multiple of the transmission data rate to provide sampled signals;

means for detecting a sampling duration $t_{i,1}-t_{i,n}$ positioned within said time window, levels of the sampled signals being higher than the predetermined threshold level during said sampling duration;

means for assuming a substantially middle point of said sampling duration as an optimum decision point of the received signal; and means for updating the time window so that the updated time window has its center at a position of said assumed optimum decision point, thereby recovering timing synchronization with the received signal wherein I is a sample number and n the number of samples.

7. The apparatus as claimed in claim 6, wherein said assuming means includes means for assuming m-th sampling point or (m+1)-th sampling point in said sampling duration $t_{i,1}-t_{i,n}$ as said optimum decision point of the received signal when the number n of samples in the sampling duration $t_{i,1}-t_{i,n}$ is an even number (n=2m, m is a natural number).

8. The apparatus as claimed in claim 7, wherein said assuming means includes means for assuming (m+1)-th sampling point in said sampling duration $t_{i,1}-t_{i,n}$ as said optimum decision point of the received signal when the number n of samples in the sampling duration $t_{i,1}-t_{i,n}$ is an odd number (n=2m+1).

* * * * *